United States Patent [19]
Ferguson

[11] Patent Number: 5,277,805
[45] Date of Patent: Jan. 11, 1994

[54] RECHARGEABLE WATER FILTER

[76] Inventor: George E. Ferguson, 2542 Selwyn Road, Victoria, B.C. V9B 3L3, Canada

[21] Appl. No.: 888,979

[22] Filed: May 26, 1992

Related U.S. Application Data

[63] Continuation-in-part of Ser. No. 590,349, Sep. 27, 1990, Pat. No. 5,116,502.

[51] Int. Cl.5 .................. B01D 27/02; B01D 27/08
[52] U.S. Cl. ............................ 210/266; 210/282; 210/420; 210/433.1; 210/453
[58] Field of Search .............. 210/232, 238, 264, 266, 210/269, 281, 282, 497.01, 433.1, 420, 453

[56] References Cited

U.S. PATENT DOCUMENTS

| | | | |
|---|---|---|---|
| 2,316,206 | 4/1943 | Wilson | 210/134 |
| 3,043,432 | 7/1962 | Megesi | 210/99 |
| 3,645,402 | 2/1972 | Alexander et al. | 210/266 |
| 3,951,811 | 4/1976 | Casolo et al. | 210/281 |
| 4,528,097 | 7/1985 | Ward | 210/353 |
| 4,654,141 | 3/1987 | Frentzel | 210/232 |
| 4,781,830 | 11/1988 | Olsen | 210/232 |
| 5,006,246 | 4/1991 | Edwards et al. | 210/282 |
| 5,015,375 | 5/1991 | Fleck | 210/232 |
| 5,035,798 | 7/1991 | Stenger | 210/232 |
| 5,108,599 | 4/1992 | Lowery | 210/232 |

Primary Examiner—Robert A. Dawson
Assistant Examiner—W. L. Millard
Attorney, Agent, or Firm—Rosenbaum & Schwartz

[57] ABSTRACT

A horizontal countertop water filter adapted to reside behind a sink faucet fixture. The water filter has a horizontal housing defining a fluid inlet chamber and fluid filtration chamber containing a changeable filter cartridge, an inlet end cap which is configured to conduct an incoming fluid flow from the fluid inlet chamber to the fluid filtration chamber, and an outlet end cap configured to receive a filtered fluid flow from the fluid filtration chamber to a fluid outlet spigot. At least one end cap is removable to facilitate changing the filter cartridge.

25 Claims, 3 Drawing Sheets

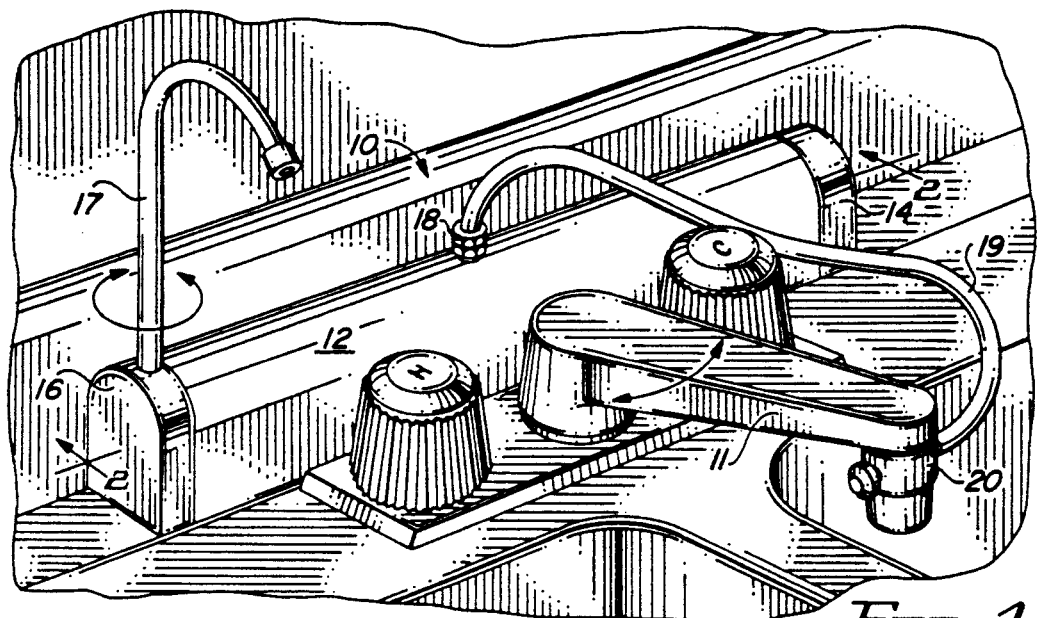
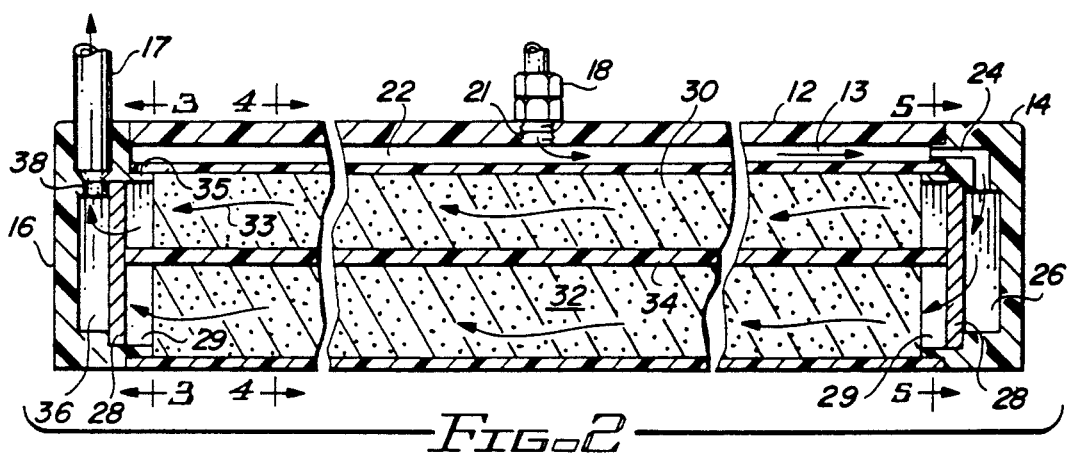
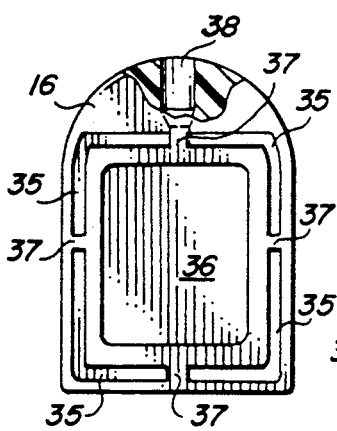 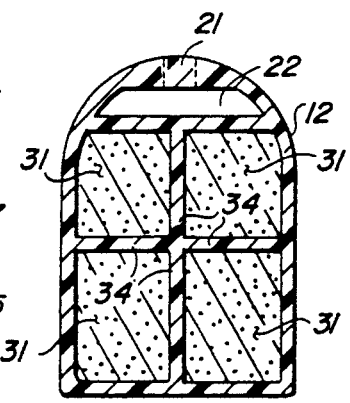 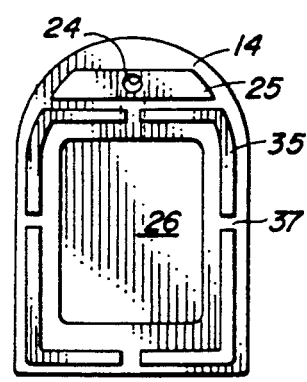

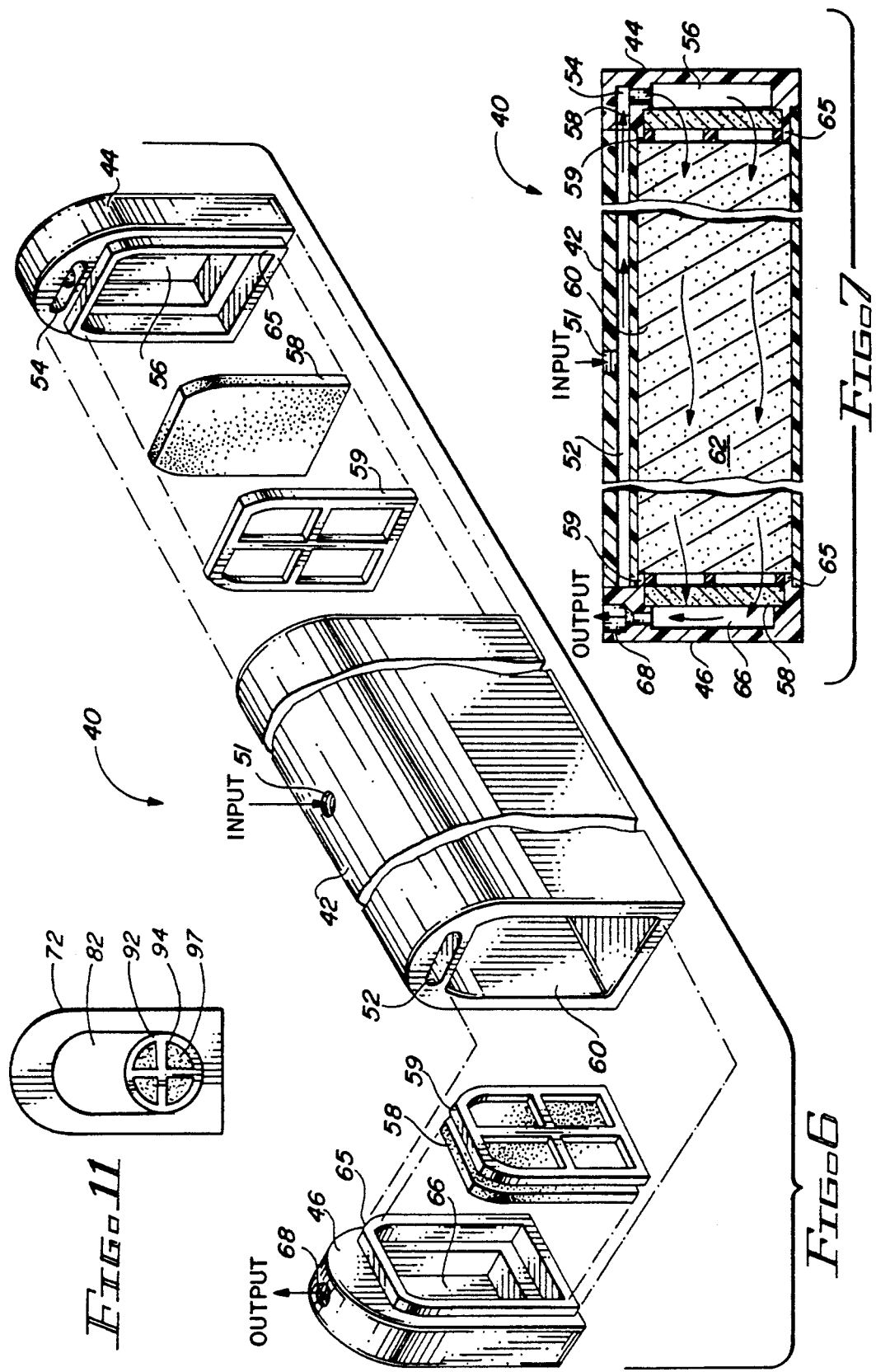

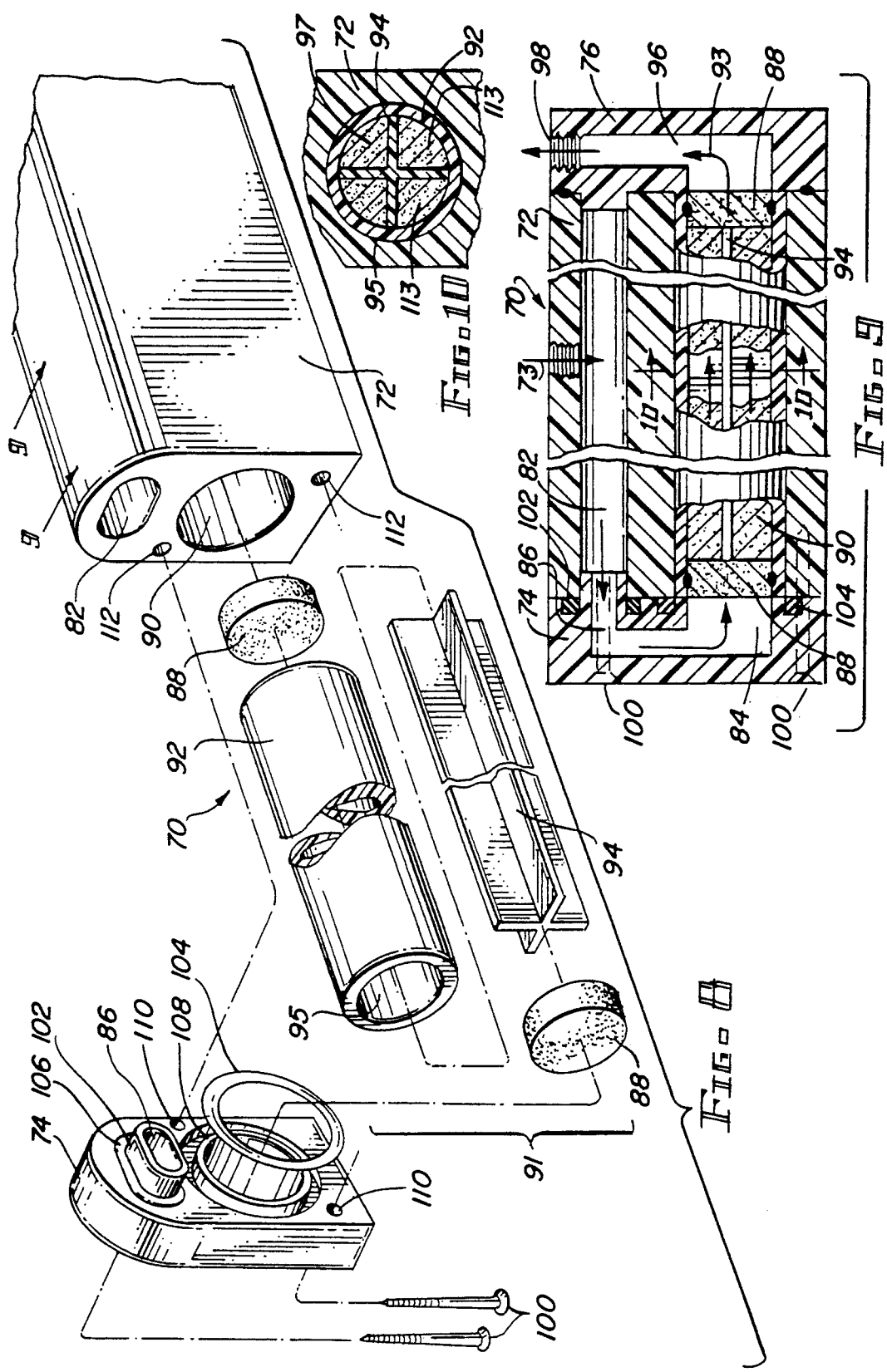

RECHARGEABLE WATER FILTER

This application is a continuation-in-part of co-pending U.S. patent application Ser. No. 07/590,349 filed Sep. 27, 1990, which is now U.S. Pat. No. 5,116,502, of which the inventor hereof is the inventor.

BACKGROUND OF THE INVENTION

The parent application teaches a water filtration apparatus which is particularly suited for domestic use to improve the potability of water. The present invention relates to countertop water filter units having changeable filter media. Filter units with changeable media allow for the removal of a used filter cartridge and the insertion of a clean filter cartridge, thereby extending the usable life of the water filter unit with the scale of economy for the end user.

It is a well-known fact that, as population densities increase, it becomes more and more difficult to provide sufficient water of satisfactory purity and potability for domestic use. The purity and quality of drinking water, even from municipal water systems, is increasingly poor and very often unsatisfactory. Furthermore, in addition to industrial and domestic pollution related to high population densities, drinking water in many locations has both a disagreeable odor and aftertaste because of dissolved materials in the water, which, while not necessarily harmful, reduce the potability of the water.

Contaminants which affect the taste of the water are particularly annoying to people who are not residents of the area from where the water is supplied. Additionally, contaminants which affect the taste of the water are particularly annoying when water is used for particular purposes, such as brewing coffee or tea, where the taste of the end product is significantly effected by the contamination.

Because of these factors, a number of filtration devices have been proposed in the past for improving drinking water. However, these prior art devices have been generally ineffective because of deficiencies and inadequacies of design. Most commonly, such filters have employed only one filtration medium, generally charcoal, and have been limited in effectiveness to remove only those contaminants for which that medium is effective. These contaminants are generally organic materials and odoriferous materials, such as dissolved halogens, which may combine readily with the carbon and the charcoal. However, there are many serious contaminants, such as disease- and illness-causing bacteria, which are not generally removed by charcoal. It has been generally thought that it is necessary, in order to remove bacteria, to boil or distill drinking water for domestic use.

Additionally, many of the domestic water filtration apparatuses are of the countertop type. These generally consist of vertical cylinders which receive water from a diverter valve attached to a sink faucet and introduce unpurified water to the bottom of a charcoal stack, flow the water upward against gravity and dispense the filtered water from a spigot located at the top of the charcoal stack. The configuration of these units is bulky and requires that the units be placed adjacent to the sink where they interfere with household tasks of washing dishes, etc. Moreover, the tubing interconnecting the diverter valve and the filtration apparatus is obtrusive and possibly dangerous to those people working near the sink. In addition, many filters are single charge units and do not provide for changing the filter medium after its filtering ability is exhausted. Thus the entire apparatus must be changed periodically, increasing the cost of the water filter.

Accordingly, there has been a continuing need for a water filter system which may be readily adapted for use as a domestic appliance for connection to domestic water supplies, which are often considered to be suitable for use for potable water, but which may be dangerously toxic. In this regard, therefore, there has been a long felt need for a water purification system which is easily utilized in conjunction with a household water distribution system, which may be used only when it is necessary to provide a supply of drinking or cooking water, is unobtrusive and may otherwise be easily stored out of the way, and is inexpensive due to the changeability of a changeable filter cartridge system. The present invention provides a unique water purification system which is particularly well adapted for use as a domestic appliance, which holds several advantages and superior features, which will be appreciated by those skilled in the art upon reading the following description of the invention with reference to its preferred embodiments.

SUMMARY OF THE INVENTION

The present invention provides a water purification system particularly adapted for use in supplying purified water for human internal consumption. The invention is particularly well-adapted for use as a kitchen appliance in connection to a kitchen sink faucet or the like for supplying drinking or cooking water. Additionally, the present invention is inexpensive due to its capability of providing a changeable filter medium.

In accordance with a broad aspect of the present invention, there is provided a water filter unit characterized by a longitudinal, horizontally-disposed filter unit, a detachable water inlet end cap leading to the filter unit, a removable and changeable adsorbent-type filter cartridge, and an outlet end cap for dispensing a purified and filtered water.

In accordance with a more particular aspect of the present invention, the filtration apparatus includes a horizontally-oriented housing having a centrally disposed inlet, which is in fluid flow communication with a diverter valve attached to a sink faucet. The housing has a pair of end caps which seal the ends of the horizontal filter, conduct an internal fluid flow from the inlet through interior chambers in the housing, and dispense a purified fluid therefrom. At least one of the end caps is removable to allow changing the filter medium cartridge.

The housing consists generally of a longitudinal inlet chamber and a larger longitudinal housing chamber capable of receiving a filter cartridge which contains any desirable filter medium or combination of filter media. Each of the end caps seal an end of the horizontal housing and communicate with at least one of the fluid inlet chamber and the cartridge-receiving filtration chamber. Specifically, an inlet end cap has a fluid conduit integral with the structure of the end cap, which communicates with the fluid inlet chamber and receives fluid therefrom and conducts the fluid through the end cap body into an opening of the end cap which, in turn, conducts the fluid to be filtered into the filtration chamber containing a filter cartridge. A second end cap, an outlet end cap, has a fluid receiving chamber or recess defined in the back of the outlet end cap which receives filtered fluid from the filtration chamber and communicates with a spigot opening in the outlet end cap body to conduct filtered fluid to a spigot. The outlet end cap is sealed against an end of the fluid inlet chamber, thereby closing the fluid inlet chamber to permit unidirectional flow within the fluid inlet chamber.

At least one of the end caps is removably connected to the fluid filter body portion, thereby allowing removal of the internal filter cartridge system. O-rings or other seals are used between the end cap and the water filter body portion to create a fluid-tight seal.

These and other objects, features and advantages of the present invention will become more apparent and better understood to those skilled in the art from the following more detailed description of the preferred embodiments of the invention taken with reference to the accompanying drawings, in which like features are identified by like reference numerals.

BRIEF DESCRIPTION OF THE DRAWINGS

FIG. 1 is a perspective view of a sink and faucet arrangement illustrating connection of the water filter of the present invention thereto and the positioning of the water filter relative thereto.

FIG. 2 is a cross-sectional view taken along line 2—2 of FIG. 1.

FIG. 3 is a cross-sectional view taken along line 3—3 of FIG. 2.

FIG. 4 is a cross-sectional view taken along line 4—4 of FIG. 2.

FIG. 5 is a cross-sectional view taken along line 5—5 of FIG. 2.

FIG. 6 is a perspective exploded view of another preferred embodiment of the water filter of the present invention.

FIG. 7 is a side elevational cross-sectional view thereof.

FIG. 8 is a perspective exploded view of an end section of another preferred embodiment of the water filter in accordance with the present invention.

FIG. 9 is a side elevational cross-sectional view taken along line 9—9 of FIG. 8.

FIG. 10 is a cross-sectional view taken along line 10—10 of FIG. 9.

FIG. 11 is a cross-sectional view illustrating an alternative embodiment of the invention.

DETAILED DESCRIPTION OF THE PREFERRED EMBODIMENTS

Turning generally to FIG. the water filter 10 of the present invention is illustrated in its intended position in engagement to a sink faucet 11 Generally, the water filter 10 consists of a horizontal housing 12, a pair of end caps 14, 16, an outlet spigot 17 attached to end cap 16, a fluid flow connector 18 connected to tubing 19 which is, in turn, connected to a diverter valve 20, attached to the outlet of the faucet 11. An important aspect of the present invention is that water filter 10 is configured, due to its horizontally elongated shape, to reside in the often unused space immediately behind the faucet 11. The fluid flow connector 18 is optimally positioned generally centrally to the horizontally elongated housing 12 such that it is in general alignment with the axis of the sink faucet 11. Those skilled in the art will appreciate that such a configuration places the water filter 10 away from the vast majority of activity in the sink, thereby eliminating a substantial disadvantage of most countertop units which reside adjacent to the sink due to their size and vertically upstanding nature. Additionally, this configuration permits user-selection of either a right-handed or left-handed orientation of the spigot 17. An alternative configuration may include displacement of the inlet opening to another point on the longitudinal axis of the housing 12, or leading directly into the end cap 14. These alternative configurations are, however, less desirable as they would require a displaced position of the filter 10 relative to the faucet 11 or compromise filter medium volume.

With reference to FIG. 2, the best mode and preferred embodiment contemplated by the present invention is illustrated in the cross-section. As previously set forth, the water filter consists of three principal components, i.e., housing 12, end cap 14 and end cap 16. Housing 12 consists generally of a fluid inlet chamber 22 which is a longitudinal chamber residing in an upper portion of the longitudinal housing 12. According to the preferred embodiment of the invention, fluid inlet chamber 22 resides immediately adjacent to an upper interior surface of the housing 12 and extends substantially the entire longitudinal aspect of the housing 12. Those skilled in the art will appreciate, however, that it is preferable, for manufacturing purposes, to have fluid inlet chamber 22 extend the entire length of the housing 12. Housing 12 further consists of a filtration chamber 30 in which a filter medium 32 may be disposed. Filtration chamber 30 is a large longitudinally oriented chamber which extends the entire length of the housing 12 and is open on both ends thereof.

Finally, housing 12 has an associated fluid inlet aperture 21 passing through an upper surface thereof which communicates with fluid inlet chamber 22. It is also desirable, but not required, to provide cross-brace members 34 within the fluid filtration chamber 30 to provide structural support. The cross-brace members 34 may extend the entire longitudinal length of the chamber or may be otherwise configured to enhance the structural rigidity of housing 12. A second purpose for cross-brace members 34, according to the preferred embodiment of the invention, is to divide filtration chamber 30 into a plurality of smaller flow chambers 31 which provides greater exposure of the fluid to the filter medium 32. By dividing filtration chamber 30 into a plurality of smaller flow sub-chambers 31, fluid entering the filtration chamber 30 is directed into the smaller flow chambers 31 by the cross-brace members 34. Settling of the fluid flow at the bottom of the filtration chamber 30 is inhibited and the fluid flow is exposed to substantially the entire body of fluid filtration medium 32.

There is also provided a fluid inlet end cap 14 and a fluid outlet end cap 16. Fluid inlet end cap 14 conducts a fluid flow 13 from fluid inlet chamber 22 into the filtration chamber 30. Fluid inlet end cap 14 is preferably formed as a single integral body having an inlet end cap receiving chamber 24 and an inlet end cap flow chamber 26. Each of the receiving chamber 24 and flow chamber 26 are formed as openings in the body of inlet end cap 14. Upon assembly with housing 12, inlet end cap receiving chamber 24 is in fluid flow communication with inlet chamber 22 of housing 12, and flow chamber 24 is in fluid flow communication with filtration chamber 30. Inlet end cap receiving chamber 24 receives the fluid flow 13 from inlet chamber 22 and conducts the fluid flow 13 through the body of the inlet end cap 14 into the inlet end cap flow chamber 26. At this point, the fluid flow 13 is positioned to enter the filtration chamber 30.

Outlet end cap 16 consists generally of an outlet receiving chamber 36 and a bore 38 in fluid flow communication therewith. As with inlet end cap 14, outlet end cap 16 is preferably formed of a single integral body having openings formed therein which form outlet receiving chamber 36 and spigot receiving bore 38. Outlet receiving chamber 36 is preferably configured in a lateral face of outlet end cap 16 and, when outlet end cap 16 is assembled with housing 12, receives the flow of filtered fluid 33 from the filtration chamber 30 and conducts the filtered fluid flow 33 from the outlet receiving chamber 36 to the bore 38. The filtered fluid flow 33 then exits through bore 38.

A filter member is operably associated with each of the inlet end cap 14 and outlet end cap 16 to prevent particulate matter from entering or leaving the filtration chamber 30 in the inlet fluid flow 13 or the filtered fluid flow 33. The filter member 28 is seated within each of the inlet end cap 14 and outlet end cap 16 adjacent to the filtration chamber 30 and interdisposed between filtration chamber 30 and each of the inlet receiving chamber 26 and outlet receiving chamber 36 of inlet end cap 14 and outlet end cap 16, respectively. According to the best mode contemplated by the invention, but not required in accordance with a preferred embodiment, a filter member retainer 29 is provided in conjunction with each of the filter members 28 which operably engages and retains the filter member 28 in an interference fit with each of the inlet end cap 14 and outlet end cap 16.

Also associated with the water filter 10 are a fluid flow connector 18 which is operably coupled to fluid inlet aperture 21 passing through housing 12 and in fluid flow communication with inlet chamber 22. Fluid connector 18 operably couples the fluid conduit 19 leading from diverter valve 20 to the housing 12 such that unfiltered fluid, diverted by diverter valve 20 from the faucet 11, is conducted through fluid conduit 19 into the inlet chamber 22 of housing 12. A rotatable spigot 17 may be operably disposed in bore 38 to receive the filtered fluid flow 33 and dispense filtered fluid from the spigot 17. It is desirable, though not necessary, to have spigot member 17 be freely rotatable within bore 38 in order to allow reciprocal orientation of the filter apparatus 10 and, thereby, facilitate either right-handed or left-handed orientation of the water filter 10 with reference to the faucet 11. Alternatively, fluid conduit may be operably connected to bore 38 and lead the filtered fluid flow 33 to a two-way diverter valve 20.

Turning now to FIGS. 3-5, there is better illustrated the preferred configurations of outlet end cap 16, filtration chamber 30, and inlet end cap 14, respectively. Outlet end cap 16 is illustrated in FIG. 3. Outlet end cap 16 consists generally of a single body having outlet receiving chamber 36 in fluid flow communication with spigot receiving bore 38. A fluid conduit 37 may be provided between outlet receiving chamber 36 and spigot receiving bore 38 to conduct fluid therebetween. Alternatively, the spigot receiving bore 38 may pass directly through the end cap body 16 to the outlet receiving chamber 36. At least one of a plurality of locking protrusions 35 project laterally from the body of outlet end cap 16 and are generally perpendicular to a longitudinal plane of end cap 16. The configuration of locking protrusions 35 corresponds to the inner peripheral dimensions of filtration chamber 30 such that an interference fit therebetween is achieved. If, as illustrated in FIG. 4, filtration chamber 30 is provided with a plurality of cross-brace members 34, it may be necessary to also provide at least one of a plurality of corresponding detents 37 as recesses in locking protrusion 35 to accommodate engagement of at least one of the cross-brace members 34 therein.

With reference to FIG. 4, there is illustrated a cross-sectional view of the housing 12 illustrating the fluid inlet chamber 22 residing in an upper portion of housing 12 and having the plurality of fluid filtration sub-chambers 31 containing the filter medium 32 therein.

Inlet end cap 14 is also preferably configured as an integral body having the fluid inlet aperture 24 and fluid receiving chamber 26 formed as openings therein. Cap receiving member 14 further consists of an inlet engagement protrusion 25 which projects laterally from the body of end cap 14 and substantially perpendicular to the longitudinal plane thereof. Inlet end cap receiving chamber 24 passes through the inlet engagement projection 25 and is in communication with receiving chamber 26. Inlet engagement protrusion 25 is configured to correspond in its dimension to fluid inlet chamber 22 such that an interference fit therebetween is achieved upon engagement of end cap 14 with housing 12. Further, as with outlet end cap 16, there are also provided at least one of a plurality of locking protrusions 35 and detents 37, if needed, to provide an interference fit and locking engagement between the end cap 14 and the filtration chamber 30, or cross-brace members 34 upon engagement of end cap 14 with housing 12 in assembly of the filter unit.

Those skilled in the art will understand and appreciate that filter housing 12 and end caps 14 and 16 may be made of any suitable plastic material, such as polyvinylchloride, polycarbonate, or other such plastic material which may be molded or extruded as is known in the art. According to the preferred embodiment, however, it is desirable to mold end caps 16 and 14 and to extrude housing 12. Extrusion of housing 12 permits formation of the continuous longitudinal inlet chambers 22 and filtration chamber 30. Furthermore, it is desirable, according to the best mode contemplated by the invention, to provide an interference engagement between each of the end caps 14 and 16 and the housing 12 and to ultrasonically or heat weld the end caps 14 and 16 to the housing 12 to provide a fluid tight engagement therebetween. Use of chemical-based adhesives is undesirable due to health and safety regulations issued by the Environmental Protection Agency. Additionally, any acceptable filter medium comporting with the health standards promulgated by the Environmental Protection Agency is contemplated. The filter members 28 are preferably a microporous material, such as a microporous polyethylene material marketed under the trademark POREX, which is die cut or otherwise configured to be engaged by and retained within each of the end caps 14 and 16.

In accordance with a second preferred embodiment of the invention as illustrated with reference to FIGS. 6 and 7, there is provided a filter 40, also consisting of a horizontally oriented longitudinal housing 42 defining an inner fluid inlet chamber 52 which extends the entire lengthwise aspect of the chamber of the housing 42 and a filtration chamber 60 for receiving and containing a filtration medium 62. Housing 42 also has an associated input aperture 51 substantially centrally disposed along the lengthwise aspect and in an upper peripheral surface thereof which communicates with the fluid inlet chamber 52. End caps 44 and 46 are provided and which correspond to outlet and inlet caps 14 and 16, respectively, of the first preferred embodiment of the invention illustrated at water filter 10 in FIGS. 1-5. According to this preferred embodiment of the invention, the inlet receiving end cap has an opening 54 which, when unassembled with housing 42 is in fluid flow communication with inlet chamber 52 to receive a fluid flow therefrom and conduct the fluid flow to the input cap of receiving chamber 56. Similarly, outlet end cap 46 has an outlet receiving chamber 66 which receives a filtered fluid flow from the filtration chamber 60 and conducts it to an output opening 68 for dispensing. According to this preferred embodiment of filter 40, a filter member 58 and, if required, a filter retaining member 59 are provided and configured to fit within the chamber defined by locking protrusions 65 on each of the end caps 44 and 46, such that an interference fit is achieved therebetween. Additionally, filtration chamber 60 is not subdivided, but form a single longitudinal chamber between end caps 44 and 46.

As with the previously described embodiment 10, this apparatus 40 according to the second embodiment is made of a suitable plastic material having physical properties of rigidity and malleability sufficient to permit formation of the housing 42 and end caps 44, 46 by extrusion or molding. The filter member 58 is preferably made of a microporous polyethylene material such as that marketed under the mark POREX.

FIG. 8 illustrates another preferred embodiment of the water filter 70 of the present invention. Generally, the water filter 70 consists of a horizontal housing 72, a pair of end caps 74, 76 (shown in FIG. 9), an inlet flow chamber 82, a filter cartridge chamber 90 and a filter cartridge 91. The filter cartridge 91 consists generally of two porous filters 88 which assist in removing particulate matter from the water and a tubular member 92 containing at least one filter medium 97 and a baffle 94.

With reference to FIG. 9, the best mode and preferred embodiment contemplated for the present invention, is illustrated in cross-section. Housing 72 consists generally of a fluid inlet chamber 82 which is a longitudinal chamber residing in an upper portion of the longitudinal housing 72. According to the preferred embodiment of the invention, fluid inlet chamber 82 resides immediately adjacent to an upper interior surface of the housing 72 and extends substantially the entire longitudinal aspect of the housing 72. Those skilled in the art will appreciate, however, that it is preferable, for manufacturing purposes, to have fluid inlet chamber 82 extend the entire length of the housing 72. Housing 72 further consists of a filtration cartridge chamber 90 in which a filter cartridge may be disposed. Filtration cartridge chamber 90 is a large longitudinally-oriented chamber which extends the entire length of the housing 72 and is open on both ends thereof.

The filter cartridge 91 is shown exploded in FIG. 8. The filter cartridge 91 consists generally of a tubular member 92 and a baffle 94. Open ends of tube 92 are closed by filter members 88. The liner of tubular member 92 forms a filtration chamber 95 into which at least one filtration medium 97 is provided.

Filter members 88 prevent particulate matter from entering or leaving the filtration chamber 95 in an inlet fluid flow 73 or a filtered fluid flow 93. Filtration medium 97 filters a fluid flow within the filtration chamber 95 and prevents chemical contaminants from leaving the filtration chamber 95 in the filtered fluid flow 93.

Baffle 94 is preferably provided to divide filtration chamber 95 into a plurality of smaller flow chambers 91 (FIG. 10) which facilitate increased exposure of the fluid to the entire filter medium 97. By dividing tubular member 92 into a plurality of smaller flow subchambers 91, fluid entering the filtration chamber 95 is directed into the smaller flow chambers 91 by the baffle members 94. Settling of the fluid flow at the bottom of the filtration chamber 95, or channeling, is inhibited, and the fluid flow is exposed to substantially the entire body of fluid filtration medium 97.

In accordance with an alternative preferred embodiment of the invention, the baffle 94 may be eliminated and a plurality of inert beads may be admixed with the filter medium to disrupt a fluid flow passing through the filter medium 97 to prevent channeling of the fluid flow at the bottom of the cartridge filtration chamber 95. The inert beads may consist of glass or plastic, so long as the selected material is non-reactive to heavy metals and other contaminants customarily found in a domestic water supply. By admixing the inert beads with the filter medium 97, a savings of filter material is realized, but the relative filtering ability of the filter medium 97 is unaffected due to the turbulence created by the presence of the inert beads in the filter medium. It has been found, in accordance with the best mode for the invention, that as much as about 65% by volume of the filter medium may consist of inert beads, without significantly diminishing the filtering ability of the filter medium.

There is also provided a fluid inlet end cap 74 and a fluid outlet end cap 76. Fluid inlet end cap 74 conducts a fluid flow 73 from fluid inlet chamber 82 into the filtration chamber 95. Fluid inlet end cap 74 is preferably formed as a single integral body having an inlet end cap receiving chamber 86, and an inlet end cap flow chamber 84. Each of the receiving chamber 86 and flow chamber 84 are formed as openings in the body of inlet end cap 74. Upon assembly with housing 72, inlet end cap receiving chamber 86 is in fluid flow communication with inlet chamber 82 of housing 72, and flow chamber 86 is in fluid flow communication with filtration chamber 95. Inlet end cap receiving chamber 86 receives the fluid flow 73 from inlet chamber 82 and conducts the fluid flow 73 through the body of the inlet end cap 74 into the inlet end cap flow chamber 84. At this point, the fluid flow 73 is positioned to enter the filtration chamber 95.

End cap 74 is removable from filter body portion 72 through use of at least one coupling means 100, such as a screw or a bolt. Coupling means 100 is positioned through hole 110 and continues into body portion 72 and into recess 112. Two O-rings 102, 104 prevent fluid leakage when end cap 74 is secured to body portion 72. O-ring 102 is located in recess 106 surrounding inlet flow chamber 86, which receives incoming water flow from inlet water chamber 82. O-ring 104 is located in recess 108 surrounding flow chamber 86, which conducts water into cartridge filter chamber 90. Those skilled in the art will understand that numerous different methods for detachably coupling end cap 74 to housing 72 are also possible, as is well known in the art.

Outlet end cap 76 consists generally of an outlet receiving chamber 96 and a bore 98 in fluid flow communication therewith. As with inlet end cap 74, outlet end cap 76 is preferably formed of a single integral body having openings formed therein, which form outlet receiving chamber 96 and spigot receiving bore 98.

Outlet receiving chamber 96 is preferably configured in a lateral face of outlet end cap 76 and, when outlet end cap 76 is assembled with housing 72, receives the flow of filtered fluid 93 from the filtration chamber 90 and conducts the filtered fluid flow 93 from the outlet receiving chamber 96 to the bore 98. The filtered fluid flow 93 then exits through bore 98. Outlet end cap 76 may be attached to the housing 72 by any known means, such as adhering, heat or sonic welding.

With reference to FIG. 10, there is illustrated a cross-sectional view of the housing 72 illustrating the fluid flow path through filter medium 97. The filtration chamber 97 is subdivided by baffle 94 into smaller flow chambers 113. The filter medium 97 is contained within each subchamber 113.

Those skilled in the art will understand and appreciate that filter housing 72 and end caps 74 and 76 may be made of any suitable plastic material such as polyvinylchloride, polycarbonate or other plastic material which may be molded or extruded as is known in the art. According to the preferred embodiment, however, it is desirable to mold end caps 76 and 74 and to extrude housing 72. Extrusion of housing 72 permits formation of the continuous longitudinal inlet chambers 82 and filtration chamber 90. It is desirable, according to the best mode contemplated by the invention, to ultrasonically or heat weld either end cap 74 or end cap 76 to the housing 72 to provide a fluid-tight engagement therebetween. The removable, non-welded end cap is secured to the body portion 72 through mechanical linkage means 100 and a fluid-tight seal is maintained through use of O-rings 102 and 104.

Porous filter medium 88 can be manufactured from any acceptable filter medium comporting with the health standards promulgated by the Environmental Protection Agency. The filter members 88 are preferably microporous materials such as a microporous polyethylene material, marketed under the trademark POREX, which is die cut and then sealingly adhered to the ends of tubular filter casing 92.

Finally, in accordance with another preferred embodiment of the invention illustrated in FIG. 11, the fluid inlet chamber 82 and the cartridge chamber 90 may be formed as a single larger chamber, the single larger chamber being configured to accept the filter cartridge 92 therein, such that the fluid inlet chamber 82 is defined between an outer surface of the filter cartridge 92 and an inner surface of the larger cartridge chamber.

While the invention has been described and disclosed with reference to the preferred embodiments thereof, those skilled in the art will understand and appreciate that numerous variations in the basic design or substitution of materials, may be made, but still fall within the intended scope of the invention, which is to be limited only by the claims appended hereto.

I claim:

1. A water filtration apparatus, comprising:
    a housing defining a horizontally-oriented interior fluid inlet chamber and a horizontally-oriented interior fluid filtration chamber both extending along a substantially lengthwise aspect of said housing and having a fluid inlet aperture passing therethrough in fluid flow communication with said interior fluid inlet chamber;
    an inlet cap member having a fluid inlet channel and a fluid receiving chamber defined therein, said inlet cap member being operably coupled to a first end of said housing wherein said fluid inlet channel is in fluid flow communication with said interior fluid inlet chamber and said fluid inlet receiving chamber is in fluid flow communication with said fluid filtration chamber of said housing;
    an outlet cap member having a fluid outlet chamber and a fluid outlet channel defined therein, said outlet cap member being operably coupled to a second end of said housing, wherein said fluid outlet chamber is in fluid communication with a second end of said fluid filtration chamber and said fluid outlet channel conducts filtered fluid external to said housing;
    at least one filter medium disposed within said fluid filtration chamber; and
    means for removing said at least one filter medium.

2. The water filtration apparatus according to claim 1, wherein said means for removing said at least one filter medium further comprises at least one removable filter cartridge containing said at least one filter medium, wherein said at least one filter cartridge slidably engages with said filtration chamber of said housing.

3. The water filtration apparatus according to claim 2, where said at least one removable filter cartridge further comprises means for subdividing said filter cartridge into a plurality of horizontally-oriented discrete fluid filtration subchambers.

4. The water filtration apparatus according to claim 3, wherein said means for subdividing said fluid filtration chamber further comprises at least one cross-brace member provided within said fluid filtration chamber and extending a substantial lengthwise aspect of said fluid filtration chamber.

5. The water filtration apparatus according to claim 1, wherein said housing further comprises a generally tubular member having a generally quadrilateral cross-section.

6. The water filtration apparatus according to claim 5, wherein said generally tubular member further has an arcuate upper section and a quadrilateral lower section, wherein said fluid inlet chamber resides within said arcuate upper section and said fluid filtration chamber resides within said quadrilateral lower section.

7. The water filtration apparatus according to claim 1, wherein said fluid inlet chamber is defined in a position superior to said fluid filtration chamber.

8. The water filtration apparatus according to claim 1, wherein said fluid filtration chamber extends an entire lengthwise aspect of said housing and opens at each of said first and said second ends of said housing.

9. The water filtration apparatus according to claim 1, wherein said fluid inlet end cap further comprises first communication means for communicating a fluid flow from said fluid inlet chamber in said housing to said fluid inlet channel in said fluid inlet end cap; and second communication means for communicating a fluid flow from said fluid receiving chamber and said inlet end cap to said filtration chamber in said housing, wherein said first and second communication means provide a fluid-tight connection between said inlet end cap and said housing.

10. The water filtration apparatus according to claim 1, wherein said fluid outlet chamber of said outlet cap member further comprises receiving means for receiving a communicated fluid flow from said fluid filtration chamber and said housing, said receiving means also providing a fluid-tight connection between said outlet cap member and said housing.

11. The water filtration apparatus according to claim 1, wherein said fluid inlet end cap or said fluid outlet end cap is removable and comprises means for securing said end cap to said housing portion, said securing means comprising at least one mechanical linkage means extending from said end cap to said housing portion.

12. The water filtration apparatus according to claim 1, wherein said at least one removable filter cartridge further comprises porous filter members sealingly adhered to open ends of said filter cartridge.

13. An apparatus for purifying water, comprising:

a horizontally-oriented housing defining at least one fluid inlet chamber and at least one fluid filtration chamber therein, said at least one inlet chamber and said at least one fluid filtration chamber extending parallel to a longitudinal axis of said housing, and a fluid inlet aperture passing therethrough in fluid flow communication with said inlet chamber;

an inlet end cap having a fluid flow channel defined therein, said inlet end cap being operably coupled to a first end of said horizontally-oriented housing, wherein said fluid flow channel is in fluid flow communication with said fluid inlet chamber and in fluid flow communication with said fluid filtration chamber of said horizontal housing, wherein the flow of fluid is received by said fluid flow channel from said fluid inlet chamber and conducted to said fluid flow channel to said fluid filtration chamber and said horizontally-oriented housing;

an outlet end cap having a fluid outlet channel defined therein, said outlet end cap being operably coupled to a second end of said horizontal housing, wherein said fluid outlet channel is in fluid communication with the second end of said fluid filtration chamber, wherein the flow of fluid is received by said fluid outlet channel and conducted external to said horizontally-oriented housing; and at least one removable filter cartridge disposed in said fluid filtration chamber, said at least one removable filter cartridge containing at least one filter medium therein.

14. The apparatus according to claim 13, wherein said inlet end cap further comprises first communication means for communicating the fluid flow from said fluid inlet channel in said housing to said fluid flow channel in said inlet end cap; and second communication means for communicating a fluid flow from said fluid flow channel to said filtration chamber in said housing, wherein said first and second communication means provide a fluid-tight connection between said inlet end cap and said housing.

15. The apparatus according to claim 14, said first communication means further comprises an engagement protrusion projecting laterally from said inlet end cap, wherein said fluid inlet opening is formed in said engagement protrusion.

16. The apparatus according to claim 13, wherein said outlet end cap further comprises receiving means for receiving a communicated fluid flow from said fluid filtration chamber in said housing, said receiving means also providing a fluid-tight connection between said outlet cap member and said housing.

17. The water filtration apparatus according to claim 13, wherein said fluid inlet end cap or said fluid outlet end cap is removable and comprises means for securing said end cap to said housing portion, said securing means comprising at least one mechanical linkage means extending from said end cap to said housing portion.

18. The apparatus according to claim 13, wherein said fluid inlet chamber is defined in a position superior to said fluid filtration chamber.

19. The apparatus according to claim 13, wherein said fluid inlet chamber substantially extends the entire longitudinal axis of said housing.

20. The apparatus according to claim 13, wherein said fluid filtration chamber extends the entire longitudinal axis of said housing and opens at each of said first and second ends of said housing.

21. The apparatus according to claim 13, wherein said filter cartridge comprises means for subdividing said filter cartridge into a plurality of horizontally-oriented discrete fluid filtration subchambers.

22. The apparatus according to claim 13, wherein said means for subdividing said fluid filtration chamber further comprises at least one baffle member provided within said fluid filtration chamber and extending a substantial lengthwise aspect of said fluid filtration chamber.

23. The apparatus according to claim 13, wherein said housing further comprises a tubular member having a generally quadrilateral cross-section.

24. The apparatus according to claim 13, wherein said generally tubular member further has an arcuate upper section and a quadrilateral lower section, wherein said fluid inlet chamber resides within said arcuate upper section and said fluid filtration chamber resides within said quadrilateral lower section.

25. The water filtration apparatus according to claim 13, wherein said removable cartridge filter system comprises porous filter members sealingly adhered to ends of said filter cartridge.

* * * * *